3,462,259
METHOD OF CONTROLLING WEEDS
Ronald B. Ames, Naugatuck, and Allen E. Smith, Bethany, Conn., assignors to Uniroyal, Inc., a corporation of New Jersey
No Drawing. Filed Nov. 2, 1966, Ser. No. 591,442
Int. Cl. A01n 9/20, 7/00
U.S. Cl. 71—121      10 Claims

ABSTRACT OF THE DISCLOSURE 3,3-dialkyl-1-(nitrophenyl)triazenes are found to be good preemergent selective herbicides.

---

This invention relates to the use of 3,3-dialkyl-1-(nitrophenyl)triazenes as preemergent herbicides. They have the formula:

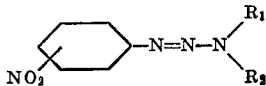

wherein $R_1$ and $R_2$ are the same or different alkyl groups having 1 or 2 carbon atoms, i.e., methyl or ethyl. The nitro group may be in the ortho-, meta- or para-position, preferably in the meta-position. The most preferred compound is 3,3-dimethyl-1-(m-nitrophenyl)triazene.

The chemicals of the present invention may be applied to soil at, before or after crop emergence and before weed emergence. This particular invention is distinct in that it may be termed a "preemergent selective herbicide." The chemicals may be applied to soil in various forms as explained below.

The chemical may be impregnated on granular organic and inorganic carriers such as corn cobs, activated carbon, attapulgite clay, mica and other types of granular carriers known in the art. They may also be pelletized as described by Gallaway Patent No. 3,056,723 or by Polon Patent No. 3,192,290. If desired, the chemicals may be mixed with a powdered solid carrier, together with a surface active dispersing agent, so that a wettable powder may be obtained which may be applied directly, or which may be shaken up with water to make an aqueous dispersion for application in that form. The chemicals may be dissolved in a solvent such as acetone, benzene or other aliphatic and aromatic hydrocarbons, and the solution of the chemical dispersed in water with the aid of a surface-active dispersing agent to give a sprayable aqueous dispersion. Such surface-active dispersing agents may be anionic, nonionic or cationic surface-active agents. Such surface-active agents are well known and reference is made to Hoffman et al., U.S. Patent No. 2,614,916, columns 2 to 4, for detailed examples of the same.

The chemicals, in the forms listed above, may be applied (1) to the soil surface, (2) to soil surface and incorporated to a depth of ½–2″, and (3) subsurface to a depth of ½″–2″ by a soil injector known in the art of applying herbicides.

The chemical may be applied to the soil at rates of 1 to 20 pounds.

To illustrate more fully the instant invention attention is directed to the following examples:

EXAMPLE I

Eighty milligrams of chemical were dissolved in 5 milliliter acetone and 30 milligrams isooctyl phenyl polyethoxy ethanol. This preparation was made up to 160 milliliters with distilled water and blended, giving a 500 p.p.m. solution. Eighty milliliters of 500 p.p.m. solution were drenched on a 150 mm. pot which contained a mixture of four broadleaf weeds, namely, pigweed—*Amaranthus retroflexus*, purslane—*Portulaca oleracea*, lambs-quarters—*Chenapodium album*, and oxeye daisy—*Chrysanthemum leucanthemum*. Also in the pot were three grass species, namely—crabgrass—*Digitaria sanguinalis*, barnyard grass—*Echinochloa Crusgalli* and giant foxtail—*Setaria faberii*. The remaining 80 milliliters were used for an additional replication. Eighty milliliters of this 500 p.p.m. solution drenched on the surface of a 150 mm. pot is equivalent to 20#/acre. Pots were subirrigated and scored 14 days later. Results are given in Table 1.

TABLE 1.—HERBICIDAL EFFECT OF CERTAIN AZOMINES AS MEASURED BY THEIR PROPERTY TO CONTROL WEEDS

| Chemical | Rate, lb./acre | Percent control Broadleaf | Grass |
|---|---|---|---|
| 3,3-dimethyl-1-(m-nitrophenyl) triazene | 20 | 98 | 98 |
| 3,3-dimethyl-1-(o-nitrophenyl) triazene | 20 | 93 | 96 |
| 3,3-diethyl-1-(m-nitrophenyl) triazene | 20 | 100 | 40 |

These results are indicative of the outstanding herbicidal properties of this invention.

EXAMPLE II

This procedure shows the true selectivity properties of 3,3-dimethyl-1-(m-nitrophenyl)triazene.

Forty-eight milliliters of an emulsifiable concentrate were made to 100 milliliters with distilled water. The emulsifiable concentrate contained 3,3-dimethyl-1-(m-nitrophenyl)triazene. Technical 15%; blend of oil soluble calcium sulfonates with polyoxyethylene ethers 9%; and monochlorobenzene 76%. The solution, when sprayed with pendulum sprayer delivering 31 gals./acre was equivalent to applying 20#/acre. All other concentrations and rates were made from this original solution. The 150 mm. plastic pots were filled to the collar with regular greenhouse potting soil. Five seeds each of soybeans—*Glycine max*, cotton—*Gossypium herbaceum* and peanuts—*Arachis hypogaea*, were placed on the surface and pressed in lightly. Two containers of soil, one which contained the three weed grasses and four broadleaf weed species, were placed in two 150 mm. x 2 mm. round petri dishes (one with grass, the other broadleaf weeds) and leveled (340 grams). Soil in petri dishes were sprayed with pendulum sprayer and then placed immediately into a tumbler to thoroughly mix the chemical with weedy soil. The soil was then placed on the 150 mm. pot containing the crop seed. One replication from each crop and each chemical rate contained grass weeds and the remaining replication consisted of broadleaf weeds.

The same procedure was used for tomato—*Lycopersicum esculentum* and sugar beets—*Beta vulgaris* var. *saccharifera*, except that the crop was planted only 6 mm. deep in the treated soil and then covered with soil remaining in petri dish. To clarify this step, the soil was removed from the tumbler and roughly 240 grams were placed on pot and leveled. One hundred seeds were planted and covered with remaining 95 grams of soil and firmed.

This procedure was used to unequivocally test the tolerance of crop seed to herbicide since the crop seeds were in direct contact with chemical.

TABLE 2.—SELECTIVE HERBICIDAL EFFECT OF 3,3-DIMETHYL-1-(m-NITROPHENYL)TRIAZENE AS MEASURED BY ITS PROPERTIES TO CONTROL WEEDS WITHOUT INJURING CROPS

| Chemical | Rate, lb./acre | Crop | Percent injury |
|---|---|---|---|
| 3,3-dimethyl-1-(m-nitrophenyl)triazene. | 20 | Soybeans | 0 |
| | | Cotton | 0 |
| | | Peanuts | 0 |
| | | Weeds | |
| | | Broadleaf | 99 |
| | | Grass | 96 |
| | | Crop | |
| | 10 | Soybean | 0 |
| | | Cotton | 0 |
| | | Peanuts | 0 |
| | | Tomato | 0 |
| | | Sugar | 0 |
| | | Weeds | |
| | | Broadleaf | 87 |
| | | Grass | 64 |

The results above show that the above herbicide has extraordinary properties to selectively control weeds without injuring certain crops. The activity shown above is unique and completely unexpected. Tomatoes and sugarbeets are extremely sensitive to most herbicides, but are tolerant at 10#/acre to the chemical in this invention.

EXAMPLE III

This procedure includes a test which further substantiates the present evidence that 3,3-dimethyl-1-(m-nitrophenyl)triazene will control weeds without killing the crop species. This test was run in Sanford, Fla. on a sandy soil.

This herbicide was used as a 75% wettable powder but also may be formulated in other ways known in the art with equal results.

The formulation used was 3,3-dimethyl-1-(m-nitrophenyl)triazene—77.3%; sodium N-methyl-N-palmitoyl taurate (Igepon TN74)—2.5%; an alkylaryl polyether alcohol (Triton X–120)—2.5%; a polymerized sodium salt of alkylnaphtholene sulfonic acid (Daxad–11)—1.0%; an alkylnaphtholene sodium sulfonate (Pegro Ag Special)—.05%; methyl cellulose (Methocel)—2.0%; and Alpine Talc—14.2%.

Two hundred and forty-two grams of formulated 3,3-dimethyl-1-(m-nitrophenyl)triazene were made up to 3.785 liters with $H_2O$. This solution, when applied at 40 gals./acre is equivalent to 16#/acre. A spray pattern 6.5 meters wide was applied with a $CO_2$ bicycle sprayer, perpendicular to the eight test crops. These included snapbeans—*Phaseolus vulgaris*, peanuts—*Arachis hypogaea*, cotton—*Gossypium herbaceum*, soybeans—*Glycine max*, sugarbeets—*Beta vulgaris*, var. *saccharifera*, cucumbers—*Cucumis sativus*, carrots—*Daucus carota* and tomatoes—*Lycopersicum esculentum*. Three weeks after planting, rates were taken as shown in Table 3.

TABLE 3.—SELECTIVE HERBICIDAL EFFECT OF CHEMICAL AS MEASURED BY ITS PROPERTY TO CONTROL WEEDS AND NOT INJURE CROPS UNDER FIELD CONDITIONS

| Chemical | Rate, lb./acre | Crop | Percent injury |
|---|---|---|---|
| 3,3-dimethyl-1-(m-nitrophenyl) triazene. | 16 | Snapbeans | 0 |
| | | Peanuts | 0 |
| | | Cotton | 0 |
| | | Soybeans | 0 |
| | | Sugarbeets | 0 |
| | | Cucumbers | 0 |
| | | Carrots | 0 |
| | | Tomatoes | 0 |
| | | Weeds | 79 |

The results show that 3,3-dimethyl-1-(m-nitrophenyl) triazene may be used effectively in the field as a selective preemergent herbicide on the eight different crops used in above test. There is no truly selective herbicide on such crops as sugarbeets, tomatoes, cucumbers and carrots to date.

Having thus described our invention, what we claim and desire to protect by Letters Patent is:

1. A method of controlling weeds which comprises applying to the soil before weed emergence a herbicidally effective amount of a compound

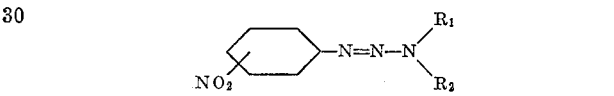

wherein $R_1$ and $R_2$ are alkyl groups having 1 or 2 carbon atoms.

2. The method of claim 1 wherein said compound is applied to the soil in the area where seeds are planted before emergence of seedlings.

3. The method of claim 1 wherein $R_1$ and $R_2$ are methyl groups and the $NO_2$ group is in the meta-position.

4. The method of claim 1 wherein $R_1$ and $R_2$ are methyl groups and the $NO_2$ group is in the ortho-position.

5. The method of claim 1 wherein $R_1$ and $R_2$ are ethyl group and the $NO_2$ group is in the meta-position.

6. The method of claim 1 wherein $R_1$ and $R_2$ are methyl.

7. The method of claim 1 wherein $R_1$ and $R_2$ are ethyl.

8. The method of claim 1 wherein said compound is 3,3-dimethyl-1-(m-nitrophenyl)triazene.

9. The method of claim 1 wherein said compound is 3,3-dimethyl-1-(o-nitrophenyl)triazene.

10. The method of claim 1 wherein said compound is 3,3-diethyl-1-(m-nitrophenyl)triazene.

References Cited

UNITED STATES PATENTS 3,138,521    6/1964    Jelinek et al. _____ 71—121 X

JAMES O. THOMAS, JR., Primary Examiner